May 2, 1933.  W. S. THOMAS  1,906,670
JUNCTION BOX
Filed May 4, 1929   2 Sheets-Sheet 1
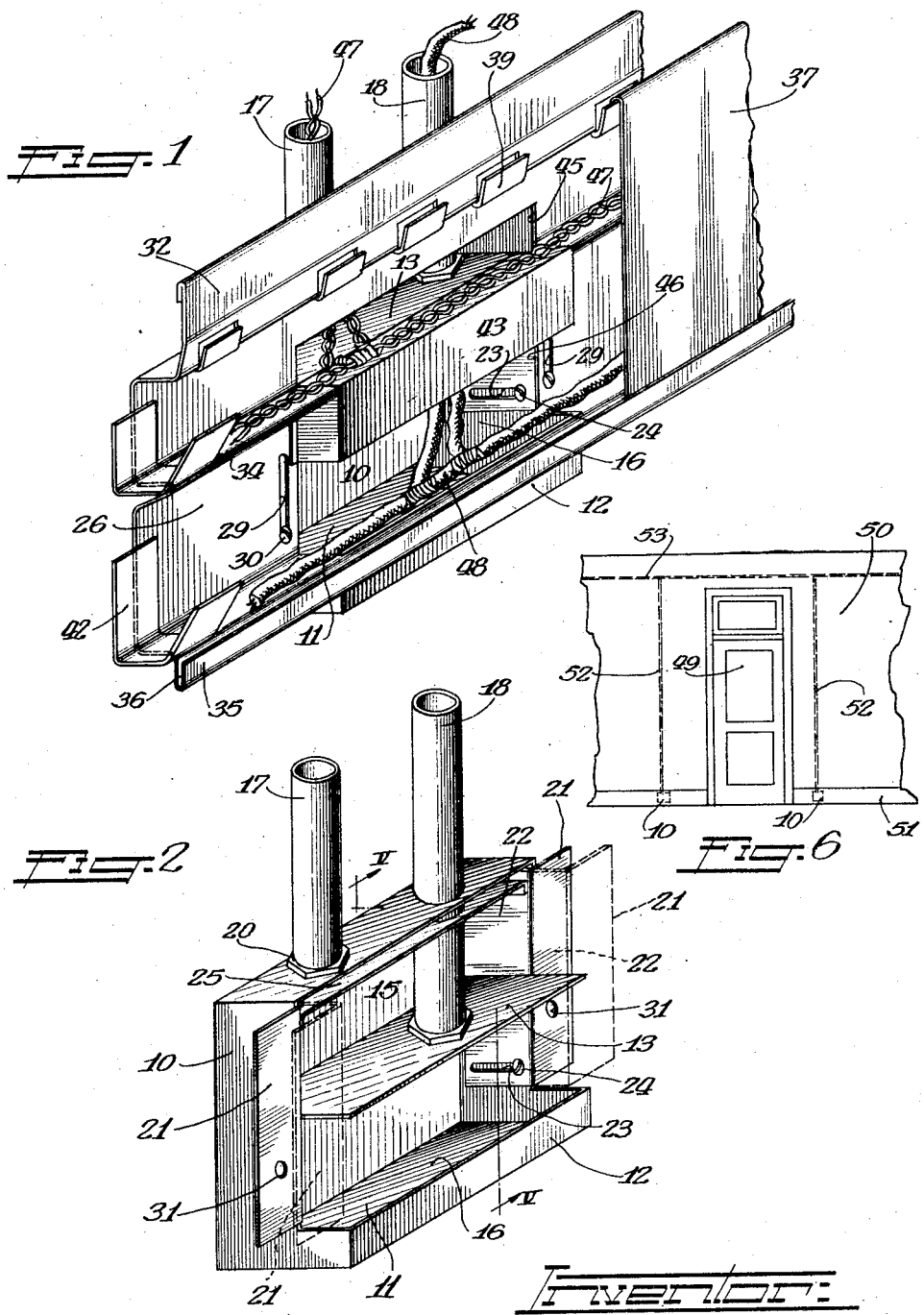

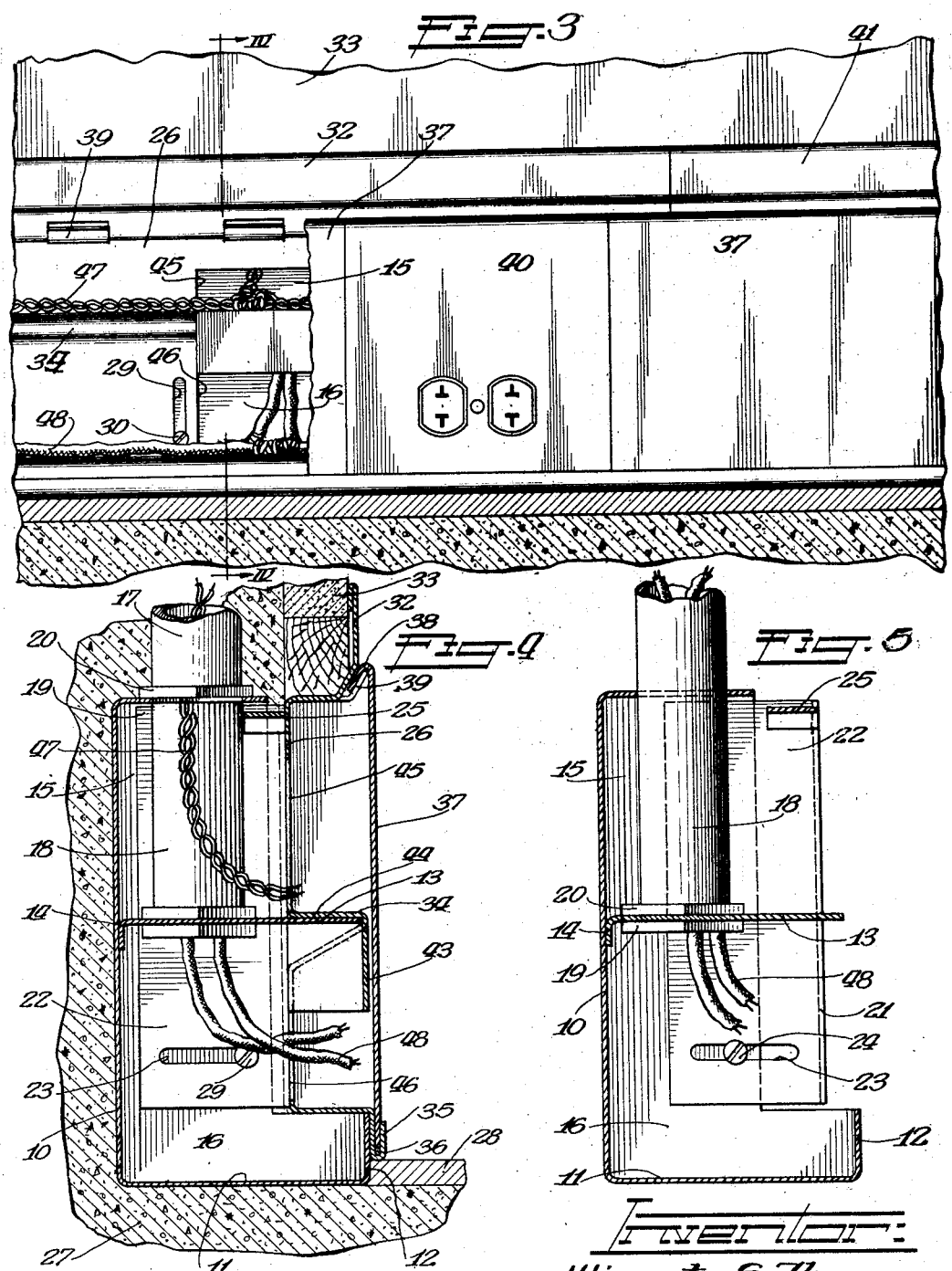

Patented May 2, 1933

1,906,670

UNITED STATES PATENT OFFICE

WINGATE S. THOMAS, OF CHICAGO, ILLINOIS, ASSIGNOR TO KNAPP BROS. MFG. CO., A CORPORATION OF ILLINOIS

JUNCTION BOX

Application filed May 4, 1929. Serial No. 360,570.

This invention relates to improvements in outlet or junction boxes of a type highly desirable for use in connection with flexible distribution systems for providing electric power in buildings and the like, although the invention may have many and varied uses, as will be apparent to one skilled in the art.

In the past, many varied outlet or junction boxes have been developed, but, especially in connection with certain types of distribution systems, have in most instances proven objectionable in that they necessitated an undesirable amount of special work for their proper installation. One highly desirable flexible distribution system incorporates the use of a tubular base board construction for the interior of rooms, corridors, and the like, and the exterior of columns, pillars, etc. In such a system the base is interiorly divided into a plurality of race-ways, there being preferably at least two race-ways, one for low tension wires or conductors, and one for high tension conductors, the base itself being preferably of such construction and of such material as to provide ample insulation for the respective conductors which are provided with no more than the customary insulation or covering of the particular conductor. With such a system outlet or junction boxes of the types heretofore known have almost invariably proven objectionable in that they necessitated special installation work at the junction of various branch circuits, and also in that the boxes themselves were not desirably or sufficiently flexible to correspond with the immediate surroundings of a particular installation.

The present invention has been designed to overcome the above noted and various other defects and objections in the provision of a junction box divided into a plurality of compartments with individual exits therefrom, whereby various conductors may enter and leave the box and be entirely insulated from each other at all times by the box structure.

The invention also seeks the provision of a junction box which may be readily adjusted or adapted to fit the immediate surroundings of a particular installation.

Another object of the present invention is the provision of an outlet or junction box highly desirable for use in connection with a double race-way base, and which permits the connection of a branch circuit with the conductors in the aforesid base at any desirable point therealong.

Still another object of the present invention is the provision of an outlet or junction box having a plurality of easily accessible entrances and as many exits, the paths between particular entrances and their corresponding exits being insulated from each other.

It is still a further object of this invention to provide an outlet or a junction box which may be readily incorporated in a dual race-way system of distribution simultaneously with the installation of the system, or at any time subsequent thereto.

While some of the more salient features, characteristics and advantages of a device embodying this invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a fragmentary perspective view showing a device embodying principles of the present invention equipped with a cover plate.

Figure 2 is a perspective view of the device itself.

Figure 3 is a fragmentary view in elevation showing an installation in which the device is incorporated.

Figure 4 is a vertical sectional view taken substantially as indicated by the line IV—IV of Figure 3.

Figure 5 is a vertical sectional view through the device as shown taken substantially as indicated by line V—V of Figure 2.

Figure 6 is a fragmentary elevational diagrammatic view indicating one method of utilizing the present invention.

As shown upon the drawings:

In the structure selected to illustrate an embodiment of the present invention, with particular reference now to Figures 2, 4 and 5, there is shown a box-like structure 10 including a bottom 11 which extends forwardly beyond the upper portion of the box and which is provided on its extended portion with an upwardly turned and relatively short flange 12. The horizontally disposed partition 13 is secured to the box 10 by welding as indicated at 14 or in any other suitable manner, and divides the box interiorly into an upper compartment 15 and a lower compartment 16, the upper compartment usually accommodating low tension conductors such as telephone, buzzer, bell wires and those of like character, and the lower compartment usually receives relatively high tension conductors such as those for the lighting circuits. The partition 13 extends outwardly substantially to the plane of the base lines 12 so as to provide separated front entrances for the compartment, and also to aid in supporting and properly positioning a cover plate as will later appear herein.

In this instance, separate and insulated outlets or exits from the compartments 15 and 16 are provided in the form of a conduit 17 leading from the compartment 15, and a conduit 18 leading from the compartment 16 and passing through the compartment 15. The conduit 17 is secured at one end thereof to a wall of the box 10 by means of a nut 19 and a lock nut 20 or in any other suitable manner, and the conduit 18 is similarly secured to the partition 13. In most installations the illustrated embodiment of the present invention will perhaps be used in the upright position as shown in the drawings, but, of course, it is understood that if occasion demands outlets in the form of the conduits 17 and 18 or in any other desired form may be provided leading from the various compartments through any desired wall of the box 10.

To render the outlet or junction box adjustable so that the same may be made to fit the surroundings of any particular location, the box is provided with a pair of outwardly extending wings 21, there being a wing adjacent each side wall of the box 10 and each wing is provided with an inwardly extending portion 22 in juxtaposed relationship with the respective side walls. Each of the inwardly extending portions 22 is provided with an elongated slot 23, the inner margins of which are engaged by the head of a stud 24 secured in any desired manner in the side wall of the box 10, whereby the respective wings 21 may be moved or slid inwardly and outwardly as indicated by the dotted lines in Figure 2, the wing riding upon the stud 24. To render the structure more rigid, a yoke 25, preferably parallel to the top wall of the box 10, joins the two wings 21 and is secured to the wings by spot welding the angularly bent ends of the yoke to the wings or in any equivalent manner. It will be noted that the yoke 25 also acts substantially as a continuation of the top wall of the box 10 when the wings are moved outwardly.

To illustrate one method of using the present invention, the herein above described embodiment (Figures 1, 3 and 4) is shown equipped with a cover plate 26. As clearly shown in Figure 4 the box 10 may be set in the fireproofing 27 of a wall or the like, the bottom of the box resting upon the floor and the upturned flange 12 abutting the floor covering 28. The cover 26 is adjustably secured to the wings 21 of the box 10, the cover being provided with spaced elongated slots 29 through each of which the shank of a stud 30 extends and is engaged in a suitable aperture 31 in the respective wing 21. By these means the cover 26 may be adjusted vertically with respect to the box 10 and by means of the slots 23 in the wings 21 the cover may be adjusted horizontally with respect to the box, so that regardless of irregularities in building construction, the cover may be positioned to properly contact with the wall and floor or floor covering as the case may be.

The cover 26 includes an upwardly extending flange 32 for engagement with the front face of plaster 33 or equivalent finishing material in the wall. Immediately below the flange, the cover is indented to a depth substantially equal to the thickness of the plaster, and then extends downwardly to substantially its mid-section where an outwardly projecting bead 34 divides the cover into an upper and a lower passage way or conduit. Adjacent the lower margin thereof, the cover 26 is provided with an upturned flange 35 spaced from a downwardly extending parallel portion to provide a groove 36 in which the lower edge of a front plate 37 normally rests. The upper margin of the front plate 37 is inwardly bent as indicated at 38 (Figure 4) whereby the same may engage in upwardly extending tongues or clips 39 on the cover 26 to thereby secure the front plate 37 in position. Obviously, the front plate 37 is easily removable, and is preferably provided in sections of any desirable or suitable length, a smaller section 40 (Figure 3) being inserted at any desired point where a plug socket is desired.

In the present installation, it is understood that the base of the wall is formed in substantially the same configuration as the cover plate 26, as indicated by the flange 41 (Figure 3) corresponding to the flange 32 on the cover plate. The base is similarly closed by a front plate 37. The cover plate is united at each end thereof with the corresponding base portion by means of clips 42 which may be joined in any desired manner to both the cover plate and base portion, and if the base portion is out of line with the cover plate when the outlet or junction box is initially positioned, the irregularity may be immediately remedied by accordingly adjusting the cover plate by means of either or both the slots 23 in the wings 21 and the slot 29 in the cover plate.

Adjacent the front of the box 10, the cover plate is apertured and provided with a central downwardly extending partition 43 having a laterally extending portion 44 which normally rests upon the partition 13 of the box 10, the partition 43 together with its inwardly extending portion 44 providing in effect an upper entrance 45 to the compartment 15 and a lower entrance 46 to the compartment 16 of the box 10. The peculiar structure of the partition 43 permits the cover 26 to be adjusted vertically with respect to the outlet box, at the same time maintaining the division between the upper and lower entrances.

The upper conduit of the base and cover plate normally contains low tension conductors 47, and the lower conduit normally contains high tension conductors 48. Assuming now that it is desired to establish a vertically extending branch circuit, a box 10 and cover plate 26 may be installed at the desired point in the base, a splice made in the low tension wires 47, and a continuation of these wires passed upwardly through the conduit 17. A splice may also be made in the high tension conductors 48 and a continuation of these conductors passed upwardly from the splice underneath the partition 43 and the partition 13 and upwardly through the conduit 18. It is at once apparent that due to the construction of the outlet or junction box, no extraneous insulation need be employed in making the necessary connections between the vertical and laterally extending conductors, the low tension and high tension conductors being at all times effectively insulated from each other. After the necessary connections have been made the front plate 37 may be placed in position and the base will appear the same as it did prior to the installing of the outlet box.

Another advantage of the present invention is exemplified in Figure 6. It frequently happens in the rearrangement of partitions within a building that new doors must be provided. Assuming, now, that it was necessary to provide a door 49 in the partition 50, which partition 50 has been provided at some time with a base of the character previously described herein, to continue the wiring in the base around the door 49, it is simply necessary to set an outlet or junction box 10 upon the floor behind the base 51, and make the proper connections as previously described herein to establish a pair of vertically rising branch circuits 52. Above the door 49 the branch circuits 52 may be interconnected by any suitable conductors disposed behind the wire mould 53, within the partition 50 or in any desirable location. In this manner conductors may be installed around the door 49 readily and easily, especially so if the conductors are installed simultaneously with the door, and channelling or otherwise mutilating the floor is entirely avoided.

It is to be noted that any desired number of compartments or passageways may be established within the box 10 to correspond with a base having a plurality of compartments or passageways therein without departing from the scope of this invention. It is also to be noted that the present invention may be utilized in the establishment of various junctions and branch circuits, those set forth herein being merely indicative examples of the use of the invention.

From the foregoing it will be apparent that I have provided an outlet or a junction box which may be easily and readily installed, and which may be effectively utilized for the establishment of branch conductors leading from a plurality of circuits, the branches from each circuit while being established in the same box are yet entirely insulated one from the other. Moreover, the box is readily adjustable to fit irregularities in the structure wherein the box is to be located. Further, the present invention is simple in construction, may be installed expeditiously and with little labor, and may be economically manufactured.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. As an article of manufacture, a junction box for use in conjunction with a wall base having a plurality of passages therein for conductors, and comprising a pair of spaced L-shaped side members in parallel planes and having their corresponding edges in the same transverse plane, an integral top, back, bottom and short front wall secured to said side members, a central partition extending outwardly beyond said side members and dividing said box interiorly into upper and lower compartments, a pin in each side member, movable members arranged for surface engagement with each side member and having slots co-operatively associated with said pins, and a yoke joining said movable members, said yoke being in effect a continuation of said top between said side members when said movable members are moved outwardly.

2. As an article of manufacture, a junction box for use in conjunction with a wall base having a plurality of passages therein for conductors, and comprising a pair of spaced L-shaped side members in parallel planes and having their corresponding edges in the same transverse plane, an integral top, back, bottom and short front wall secured to said side members, a central partition extending outwardly beyond said side members and dividing said box interiorly into upper and lower compartments, a pin in each side member, movable members arranged for surface engagement with each side member and having slots co-operatively associated with said pins, outwardly extending wings on said movable members, a pin on each of said wings and a cover having slots therein co-operatively associated with the pins in said wings.

3. As an article of manufacture, a junction box for use in conjunction with a wall base having a plurality of passages therein for conductors and comprising a pair of spaced L-shaped side members in parallel planes and having their corresponding edges in the same transverse plane, an integral top, back, bottom and short front wall secured to said side members, a central partition extending outwardly beyond said side members and dividing said box interiorly into upper and lower compartments, a pin in each side member, movable members arranged for surface engagement with each side member and having slots co-operatively associated with said pins, outwardly extending wings on said movable members, a pin on each of said wings, a cover having slots therein co-operatively associated with the pins in said wings, a bend in said cover engaging the said extended partition and a lower bend and a flange engaging said short front wall.

4. In a junction box for use with a base having a plurality of separate passages for conductors, means whereby said box may receive a front plate in proper relation to said base and adjoining wall surfaces, said means comprising stationary side members, a pin in each of said members, movable members arranged for surface engagement with each side member and having slots co-operatively associated with said pins, outwardly extending wings on said movable members, a pin in each of said wings, and a cover having slots therein co-operatively associated with the pins in said wings.

5. In a junction box for use with a wall base having a plurality of separate passages for conductors, means for varying the effective depth of said box, said means comprising stationary L-shaped side members, a pin in each of said members, movable members arranged for surface adjustment with each side member and having slots co-operatively associated with said pins, and a yoke joining said movable members, said yoke being in effect a continuation of a wall of said box between said side members, when said movable members are moved outwardly.

6. In combination, a wall base housing having a plurality of separate passages therein for conductors, a junction box for disposition in a wall and having a plurality of compartments to correspond to said passages, a cover for said box having a similar configuration to said housing and means for adjusting said cover in alignment with said housing, said means comprising a pair of telescoping side members on said box, outwardly extending wings on said members, a pin in each of said wings, and slots in said cover co-operatively associated with said pins.

7. As an article of manufacture, an outlet box for use in conjunction with a base having a plurality of conduit-like passages therein, said box including a box-like structure seatable on a floor and having a front open side, the bottom of said structure extending outwardly beyond the upper structure so as to underlie the major part of said base, a horizontal partition dividing said box into upper and lower compartments, a conduit secured to the top of said box and communicating with said upper compartment, and a second conduit extending thru said upper compartment and secured to said partition for communicating with said lower compartment.

In testimony whereof I have hereunto subscribed my name at Chicago, Cook County, Illinois.

WINGATE S. THOMAS.